United States Patent
Lindoff

(10) Patent No.: US 8,437,308 B2
(45) Date of Patent: May 7, 2013

(54) HANDOVER MEASUREMENTS IN A MOBILE COMMUNICATION SYSTEM

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 589 days.

(21) Appl. No.: 12/612,773

(22) Filed: Nov. 5, 2009

(65) Prior Publication Data

US 2011/0103350 A1 May 5, 2011

(51) Int. Cl.
*H04W 4/00* (2009.01)

(52) U.S. Cl.
USPC .......................................... 370/331; 370/332

(58) Field of Classification Search .................. 370/332, 370/331
See application file for complete search history.

(56) References Cited

U.S. PATENT DOCUMENTS

| | | | |
|---|---|---|---|
| 6,597,911 B1 | 7/2003 | Kransmo | |
| 7,313,116 B2 | 12/2007 | Lee et al. | |
| 7,496,113 B2 | 2/2009 | Cai et al. | |
| 7,525,948 B2 | 4/2009 | Schwarz et al. | |
| 2003/0117980 A1* | 6/2003 | Kim et al. | 370/332 |
| 2003/0117984 A1* | 6/2003 | Gavette | 370/338 |
| 2004/0202119 A1* | 10/2004 | Edge | 370/324 |
| 2007/0116094 A1 | 5/2007 | Parts et al. | |
| 2007/0135125 A1 | 6/2007 | Kim et al. | |
| 2007/0191053 A1* | 8/2007 | Suzuki | 455/522 |
| 2007/0293224 A1 | 12/2007 | Wang et al. | |
| 2007/0297324 A1 | 12/2007 | Lindoff et al. | |
| 2008/0095108 A1 | 4/2008 | Malladi et al. | |
| 2008/0227456 A1 | 9/2008 | Huang et al. | |
| 2008/0233988 A1 | 9/2008 | Yang et al. | |
| 2008/0298326 A1 | 12/2008 | Pande et al. | |
| 2008/0316911 A1 | 12/2008 | Wilhelmsson et al. | |
| 2009/0011762 A1 | 1/2009 | Han et al. | |
| 2009/0042572 A1 | 2/2009 | Craig et al. | |
| 2009/0046671 A1 | 2/2009 | Luo | |
| 2009/0047957 A1 | 2/2009 | Westerberg | |

(Continued)

FOREIGN PATENT DOCUMENTS

| | | |
|---|---|---|
| WO | 2008/083886 A1 | 7/2008 |
| WO | 2009/095369 A1 | 8/2009 |

OTHER PUBLICATIONS

PCT International Search Report, mailed Jan. 14, 2011, in connection with International Application No. PCT/EP2010/066818.

(Continued)

*Primary Examiner* — Sai-Ming Chan
(74) *Attorney, Agent, or Firm* — Potomac Patent Group PLLC

(57) ABSTRACT

A cellular communication system has an air interface divided into frames, each consisting of sub-frames at least two of which are synchronization sub-frames. For each cell, different cell-related synchronization signals are transmitted to user equipments (UEs) in different synchronization signal sub-frames. The UE detects cell identities of first and second cells. Weights then control generation of weighted handover measurements made from the first cell's synchronization signals received during synchronization sub-frames, wherein each of the weights is a function of the cell identity of the first cell, the cell identity of the second cell, and which ones of the first and second cells' cell-related synchronization signals are transmitted in the respective one of the plurality of synchronization sub-frames during which the weight is applied. A filtered handover measurement, upon which a handover decision can be made, is generated from the weighted handover measurements.

18 Claims, 13 Drawing Sheets

U.S. PATENT DOCUMENTS

| | | | |
|---|---|---|---|
| 2009/0047958 A1 | 2/2009 | Rimhagen et al. | |
| 2009/0074100 A1 | 3/2009 | Bae | |
| 2009/0080407 A1 | 3/2009 | Onggosanusi et al. | |
| 2009/0086669 A1 | 4/2009 | McCoy et al. | |
| 2009/0117896 A1 | 5/2009 | Baldemair et al. | |
| 2009/0135761 A1 | 5/2009 | Khandekar et al. | |
| 2009/0135804 A1 | 5/2009 | Swarts et al. | |
| 2009/0190679 A1 | 7/2009 | Lindoff et al. | |
| 2009/0252113 A1* | 10/2009 | Take | 370/331 |
| 2009/0290555 A1* | 11/2009 | Alpert et al. | 370/331 |

OTHER PUBLICATIONS

PCT Written Opinion, mailed Jan. 14, 2011, in connection with International Application No. PCT/EP2010/066818.

Ericsson et al. "Enabling Enhanced Cell DTX in LTE" 3GPP Draft; R1-101309, 3GPP, Mobile Competence Centre, 650 Route Des Lucioles, F-06921 Sophia-Antipolis Cedex, France, vol. RAN WG1, no. San Francisco, USA; 20100222, Feb. 16, 2010, XP050418808.

* cited by examiner

HANDOVER MEASUREMENTS IN A MOBILE COMMUNICATION SYSTEM

BACKGROUND

The present invention relates to mobile/cellular communication systems, and more particularly to techniques and apparatuses for performing handover measurements in a cellular communication system.

To facilitate the following discussion, terminology and network configurations that comply with the Third Generation Long Term Evolution (LTE) standard are primarily used herein because these are known and will be readily understandable to the person of ordinary skill in the art. However, the selection of this terminology and these configurations is made solely for the purpose of example rather than limitation. The various inventive aspects to be described in this document are equally applicable in many different mobile communications systems complying with different standards and possibly utilizing different terminology.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high-capacity high-data rate system in existing radio spectrum, a new system has to be able to utilize a bandwidth of varying size. The LTE system has been developed for this purpose. It is a new flexible cellular system that can be seen as an evolution of the 3G WCDMA standard. This system will use OFDM as the multiple access technique (called OFDMA) in the downlink and will be able to operate on bandwidths ranging from 1.4 MHz to 20 MHz. Furthermore, data rates up to and exceeding 100 Mb/s will be supported for the largest bandwidth. However, it is expected that LTE will be used not only for high rate services, but also for low rate services like voice. Since LTE is designed for Transmission Control Protocol/Internet Protocol (TCP/IP), Voice over IP (VoIP) will likely be the service that carries speech.

FIG. 1 illustrates a mobile communication service area 101, such as an LTE system service area, that comprises a number of cells 103. User Equipment (UE) (e.g., the UE 105) located in a cell is served by an antenna in that cell. (A UE is the 3GPP name for a mobile terminal.) The antenna is coupled to a node in the communication system so that communication data can be routed between the UE and other equipment through the communication system.

A simplified cell planning diagram is depicted in FIG. 2. A core network (not shown) is connected to one or more evolved UTRAN Node Bs (eNodeB) (201-1, 201-2) (generally referred to by means of reference numeral 201). Each eNodeB 201 is capable of communicating with every other eNodeB 201 in the same network. As can be seen in FIG. 2, one eNodeB 201 connects to one or more antennas, 203-1, 203-2, . . . , 203-M (generally referred to by the reference numeral 203). The eNodeB 201 is a logical node handling the transmission and reception of signals associated with a set of cells. Logically, the antennas of the cells belong to the eNodeB but they are not necessarily located at the same antenna site. Thus, one eNodeB 201 can be responsible for one or more cells. It is the ability of serving cells not transmitting from the same antenna site that makes a NodeB different compared to what in other types of systems are called a "Base Transceiver Station (BTS)", "Base Station (BS)", or "Radio Base Station (RBS)". However, in this specification the term "base station" is used as a generic term, rather than a system-specific term, to further emphasize that the invention is not limited to applications in only the specific exemplary systems.

The LTE physical layer downlink transmission is based on OFDM. The basic LTE downlink physical resource can thus be seen as a time-frequency grid as illustrated in FIG. 3, in which each so-called "resource element" (see, e.g., shaded area in FIG. 3) corresponds to one OFDM subcarrier during one OFDM symbol interval. (An OFDM symbol interval is the amount of time during which one OFDM symbol is transmitted.)

As illustrated in FIG. 4, the downlink subcarriers in the frequency domain are grouped into resource blocks, where (in an LTE system) each resource block consists of twelve consecutive subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c = 12 \cdot N_{RB} + 1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB\text{-}min} = 6$ and upwards, corresponding to a nominal transmission bandwidth ranging from around 1 MHz up to well beyond 20 MHz. This allows for a very high degree of LTE bandwidth/spectrum flexibility, at least from a physical-layer-specification point-of-view.

FIGS. 5a and 5b illustrate the time-domain structure for LTE downlink transmissions. Each 1 ms sub-frame 500 consists of two slots, each of length $T_{slot} = 0.5$ ms ($=15360 \cdot T_S$, wherein each slot comprises 15,360 time units, $T_S$). Each slot then consists of a number of OFDM symbols.

A subcarrier spacing $\Delta f = 15$ kHz corresponds to a useful symbol time $T_u = 1/\Delta f \approx 66.7$ μs ($2048 \cdot T_S$). The overall OFDM symbol time is then the sum of the useful symbol time and the cyclic prefix length $T_{CP}$. Two cyclic prefix lengths are defined. FIG. 5a illustrates a normal cyclic prefix length, which allows seven OFDM symbols per slot to be communicated. The length of a normal cyclic prefix, $T_{CP}$, is $160 \cdot T_S 5.1$ μs for the first OFDM symbol of the slot, and $144 \cdot T_S \approx 4.7$ μs for the remaining OFDM symbols.

FIG. 5b illustrates an extended cyclic prefix, which because of its longer size, allows only six OFDM symbols per slot to be communicated. The length of an extended cyclic prefix, $T_{CP\text{-}e}$, is $512 \cdot T_S 16.7$ μs. The extended cyclic prefix is useful when, for example, coordinating several cells to operate together as a Single Frequency Network (SFN) since the longer cyclic prefix allows a receiver to make accommodations for longer signal paths.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of $12 \cdot 7 = 84$ resource elements for the case of normal cyclic prefix (illustrated in FIG. 4), and $12 \cdot 6 = 72$ resource elements for the case of the extended cyclic prefix (not shown).

Another important aspect of a terminal's operation is mobility, an aspect of which is cell search. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information on the broadcast channel, containing the remaining parameters required for accessing the system.

To avoid complicated cell planning, the number of physical layer cell identities ("cell IDs") should be sufficiently large. For example, systems in accordance with the LTE standards support 504 different cell identities. These 504 different cell identities are divided into 168 groups of three identities each.

In order to reduce the cell-search complexity, cell search for LTE is typically done in several steps that make up a process that is similar to the three-step cell-search procedure of WCDMA. To assist the terminal in this procedure, LTE provides a primary synchronization signal (PSS) and a secondary synchronization signal (SSS) on the downlink. This is illustrated in FIG. 6, which shows the structure of the radio interface ("air interface") of an LTE system. The physical layer of an LTE system includes a generic radio frame 600 having a duration of 10 ms. FIG. 6 illustrates one such frame 600 (the LTE air interface is divided up timewise into sequentially occurring frames) for an LTE Frequency Division Duplex (FDD) system. Each frame has 20 slots (numbered 0 through 19), each slot having a duration of 0.5 ms which normally consists of seven OFDM symbols. A sub-frame is made up of two adjacent slots, and therefore has a duration of 1 ms, normally consisting of 14 OFDM symbols. As there are 20 slots per radio frame and 2 slots per sub-frame, there are therefore 10 sub-frames per frame (numbered 0 through 9). The primary and secondary synchronization signals are specific sequences, inserted into the last two OFDM symbols in the first slot of each of sub-frames 0 and 5. For purposes of this disclosure, the sub-frames in which the primary and secondary synchronization signals are inserted are distinguished from other sub-frames by use of the term "synchronization sub-frame." Thus, in the LTE example, two of the ten sub-frames (namely sub-frames 0 and 5) are considered to be "synchronization sub-frames".

In addition to the synchronization signals, part of the operation of the cell search procedure also exploits reference signals that are transmitted at known locations in the transmitted signal.

In the first step of the cell-search procedure, the mobile terminal uses the primary synchronization signal to find the timing of the 5 ms slots. Note that the primary synchronization signal is transmitted twice in each frame. One reason for this is to simplify handover of a call from, for example, a GSM system, to an LTE system. However, transmitting the primary synchronization signal twice per frame creates an ambiguity in that it is not possible to know whether the detected Primary Synchronization Signal is associated with slot #0 or slot #5 (see FIG. 6). Accordingly, at this point of the cell-search procedure, there is a 5 ms ambiguity regarding the frame timing.

In many cases, the timing in multiple cells is synchronized such that the frame start in neighboring cells coincides in time. One reason for this is to enable MBSFN operation. However, synchronous operation of neighboring cells also results in the transmission of the primary synchronization signals in the different cells occurring at the same time. Channel estimation based on the primary synchronization signal will therefore reflect the composite channel from all such cells if the same primary synchronization signal is used in those cells. For coherent demodulation of the second synchronization signal, which is different in different cells (and are hence "cell-related"), an estimate of the channel from the cell of interest is required, not an estimate of the composite channel from all cells. Therefore, LTE systems support multiple (presently three) sequences for the primary synchronization signals. To enable coherent reception of a particular cell's signals in a deployment with time-synchronized cells, neighboring cells are permitted to use different primary synchronization sequences to alleviate the channel estimation problem described above. If there is a one-to-one mapping between the primary synchronization signal used in a cell and the identity within a cell identity group, the identity within the cell identity group can also be determined in the first step.

In the next step, the terminal detects the cell identity group and determines the frame timing. This is done by observing pairs of slots in which the secondary synchronization signal is transmitted. To distinguish between secondary synchronization signals located in different synchronization sub-frames, in this case sub-frame #0 and sub-frame #5, the secondary synchronization signals are constructed in the form of $(S_1, S_2)$. If $(S_1, S_2)$ is an allowable pair of sequences, where $S_1$ and $S_2$ represent the secondary synchronization signal in sub-frames #0 and #5, respectively, the reverse pair $(S_2, S_1)$ is not a valid sequence pair. By exploiting this property, the terminal can resolve the 5 ms timing ambiguity that resulted from the first step in the cell search procedure, and determine the frame timing. Furthermore, as each combination $(S_1, S_2)$ represents a particular one of the cell groups, the cell group identity is also obtained from the second cell search step. The identity of the cell then can be used to determine the reference (or pilot) signal sequence and its allocation in the time-frequency grid.

The synchronization signals occupy 62 resource elements in the center of the allocated bandwidth. Five resource elements on either side of the 62 resource elements are set to zero, making a total of 72 resource elements in which the synchronization signals can be found during sub-frames #0 and #5 as described above. To distinguish between the secondary synchronization signal $S_1$ and the secondary synchronization signal $S_2$, each is created as a function of a pair of sequences $\tilde{S}_i, \tilde{S}_j$. That is, $S_1 = f_1(\tilde{S}_i, \tilde{S}_j)$ and $S_2 = f_2(\tilde{S}_i, \tilde{S}_j)$, as illustrated in FIG. 7a. Each of the sequences $\tilde{S}_i, \tilde{S}_j$ is one of 31 different M-sequences, which is essentially a certain pn-sequence.

In LTE, the function for deriving $S_1$ and $S_2$ is implemented in the frequency domain by transmitting the sequences $\tilde{S}_i$ and $\tilde{S}_j$ simultaneously by means of interleaving. For example, given two sets of frequencies that are interleaved with one another, transmission of the symbol $S_1$ can be performed by transmitting the sequence $\tilde{S}_i$ in a "lower" one of the sets of interleaved frequencies and transmitting the sequence $\tilde{S}_j$ in a "higher" one of the sets of frequencies. (Here, the words "higher" and "lower" do not refer to the sets of frequencies as a single contiguous group, but rather to pairs of resource elements associated with the interleaved frequencies, so that one resource element associated with $\tilde{S}_i$ is on a lower frequency than the neighboring resource element associated with $\tilde{S}_j$.) Transmission of the symbol $S_2$ is the opposite, with the sequence $\tilde{S}_j$ being transmitted in a lower one of the sets of frequencies and the sequence $\tilde{S}_i$ being transmitted in a higher one of the sets of frequencies. This arrangement is illustrated in FIG. 7b. (To simplify the diagram, the unused DC carrier is not shown in FIG. 7b.)

A UE preferably includes a look-up table that associates each sequence pair and ordering with a cell group identifier and frame timing information (i.e., whether the ordering of the sequence pair indicates sub-frame 0 or sub-frame 5), so that the UE can easily identify the cell group and frame timing.

Once the cell search procedure is complete, the terminal receives the system information to obtain the remaining parameters (e.g., the transmission bandwidth used in the cell) necessary to communicate with this cell. This broadcast information is transmitted on the BCH transport channel.

The secondary synchronization signals can also be used for purposes other than identifying frame timing cell groups. For example, these signals are useful for assisting positioning services to determine a geographical position of a mobile terminal. The possibility of determining the position of a mobile device has enabled application developers and wireless network operators to provide location based, and location aware, services. Examples of such services include guiding systems, shopping assistance, friend finder, presence services, community and communication services and other information services giving the mobile user information about their surroundings.

In addition to the commercial services, governments in several countries require network operators to be able to determine the position of an emergency call. For instance, governmental regulations in the USA (FCC E911) require that it must be possible to determine the position of a certain percentage of all emergency calls. The requirements make no difference between indoor and outdoor environments.

Another issue that has recently emerged as important is energy efficiency in the base station (network). In order to reduce the cost for the operators, it is essential to reduce the base station power consumption, especially in low load scenarios. One such feature is to introduce a discontinuous transmission (DTX) strategy in the eNode Bs, whereby the eNode B can go to sleep in accordance with a certain duty cycle whenever there is no or low load in the cell. However, even when there is no load, the eNode B cannot remain indefinitely in a sleep mode because some information needs to be transmitted from eNode Bs in order to make it possible for UEs to find and synchronize to cells.

Additionally, the eNode Bs need to provide signals that are used for handover (HO) measurement purposes. In LTE Release 8, reference signals, transmitted in two OFDM symbols of every slot, are used for such handover measurements.

It is therefore desired to provide methods and apparatuses that enable an eNode B to increase the possibility of entering a DTX mode while continuing to provide necessary information to UEs within its coverage area.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses performed by a user equipment operating in a mobile communication system that comprises equipment for serving a plurality of geographic cells and having an air interface that is divided into sequentially occurring frames, wherein each of the frames consists of a plurality of sub-frames at least two of which are synchronization sub-frames, wherein for each of the cells served by the mobile communication system, a respective one of a plurality of cell-related synchronization signals is transmitted to user equipments in the at least two synchronization signal sub-frames of every frame. The method comprises detecting cell identities of respective first and second cells in the mobile communication system. A plurality of weights is used to control generation of a plurality of weighted handover measurements made from the first cell's synchronization signals received during a plurality of synchronization sub-frames. In particular, the plurality of weights are applied to measurements made for the first cell during respective ones of the plurality of synchronization sub-frames, and each of the weights is a function of the cell identity of the first cell, the cell identity of the second cell, and which ones of the first and second cells' cell-related synchronization signals are transmitted in the respective one of the plurality of synchronization sub-frames during which the weight is applied. A filtered handover measurement is then generated from the weighted handover measurements. For example, in some but not necessarily all embodiments, this involves generating an average handover measurement from the weighted handover measurements. The filtered handover measurement can be provided to a handover process that uses the filtered handover measurement to control a handover process involving the user equipment.

In some embodiments, each of the cell-related synchronization signals comprises a primary synchronization signal and a secondary synchronization signal, wherein the secondary synchronization signal conveys both a first sequence and a second sequence. In at least some of these embodiments, the plurality of weights to be applied to measurements made for the first cell during respective ones of the plurality of synchronization sub-frames are determined by:

ascertaining whether the primary synchronization signal of the first cell is the same as the primary synchronization signal of the second cell; and ascertaining at least one of the following:
  whether the first sequence conveyed by the secondary synchronization signal of the first cell is the same as the first sequence conveyed by the secondary synchronization signal of the second cell; and
  whether the second sequence conveyed by the secondary synchronization signal of the first cell is the same as the second sequence conveyed by the secondary synchronization signal of the second cell.

In an aspect of some embodiments, a weight of zero is applied to a measurement made for the first cell during any synchronization sub-frame in which both the primary synchronization signals and the first sequences conveyed by the secondary synchronization signals of the first and second cells are the same, and/or both the primary synchronization signals and the second sequences conveyed by the secondary synchronization signals of the first and second cells are the same.

In some instances, applying a weight of zero to a measurement made for the first cell comprises inactivating a receiver of the user equipment, and not contributing a weighted handover measurement to the plurality of weighted handover measurements.

In yet another aspect of some embodiments consistent with the invention, each of the weights is a function of, for any given one of the synchronization sub-frames, a level of correlation between a cell-related synchronization signal of the first cell communicated during the given synchronization sub-frame and a cell-related synchronization signal of the second cell communicated during the given synchronization sub-frame. The weights can, for example, be binary (i.e., having values only of zero and one), or alternatively they can have values ranging from 0 to 1.

In still another aspect of some embodiments, determining a weight to be applied to a measurement made for the first cell during any given one of the synchronization sub-frames by using the cell identity of the first cell and the cell identity of the second cell as indices into a table stored in an addressable memory device, wherein the table is pre-programmed with values related to correlation levels between cell-related synchronization signals of respective different pairs of cells, wherein the higher the correlation level the lower the weight.

In yet another aspect, weighting can be implemented such that one or more of the weights result in more than none and less than all frequency components of a received synchronization signal contributing to a handover measurement.

BRIEF DESCRIPTION OF THE DRAWINGS

The objects and advantages of the invention will be understood by reading the following detailed description in conjunction with the drawings in which.

DETAILED DESCRIPTION

Figure 1:
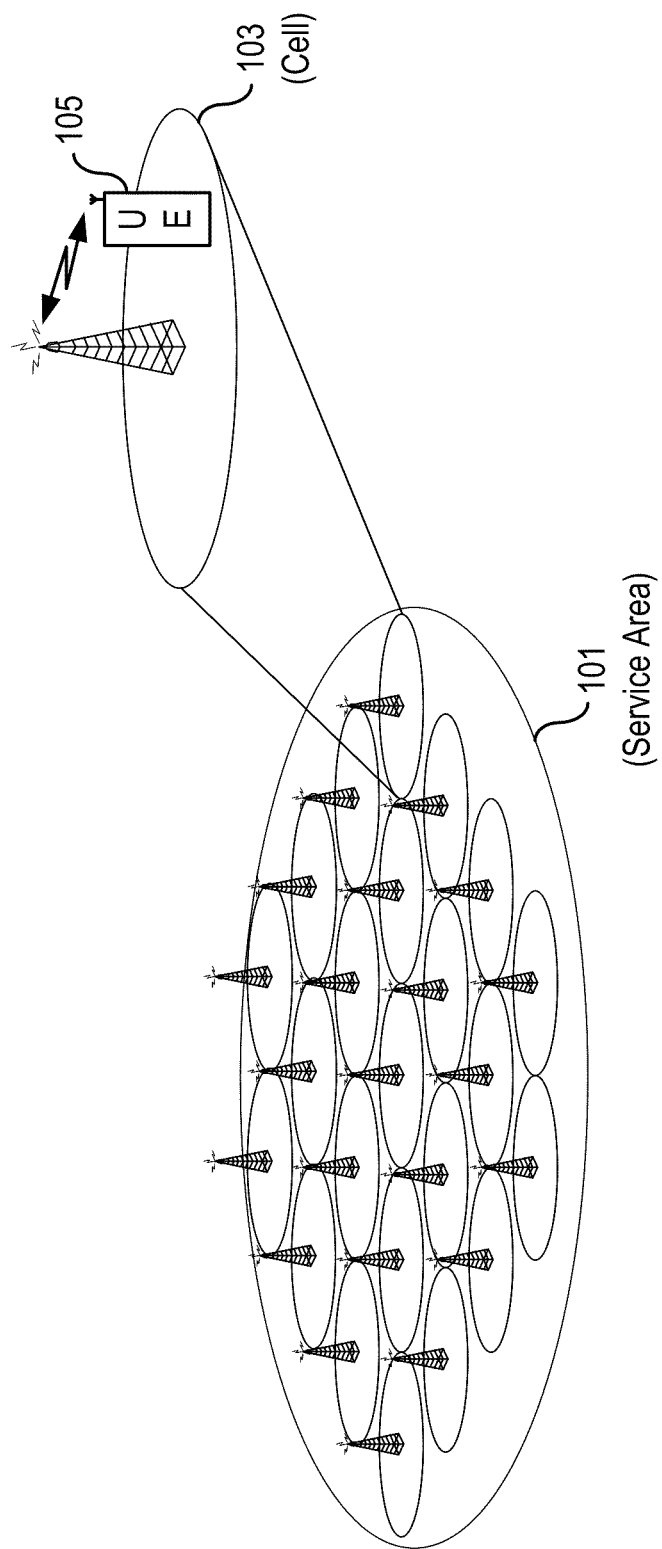
FIG. 1 illustrates a mobile communication service area, such as an LTE system service area, that comprises a number of cells.
Figure 2:
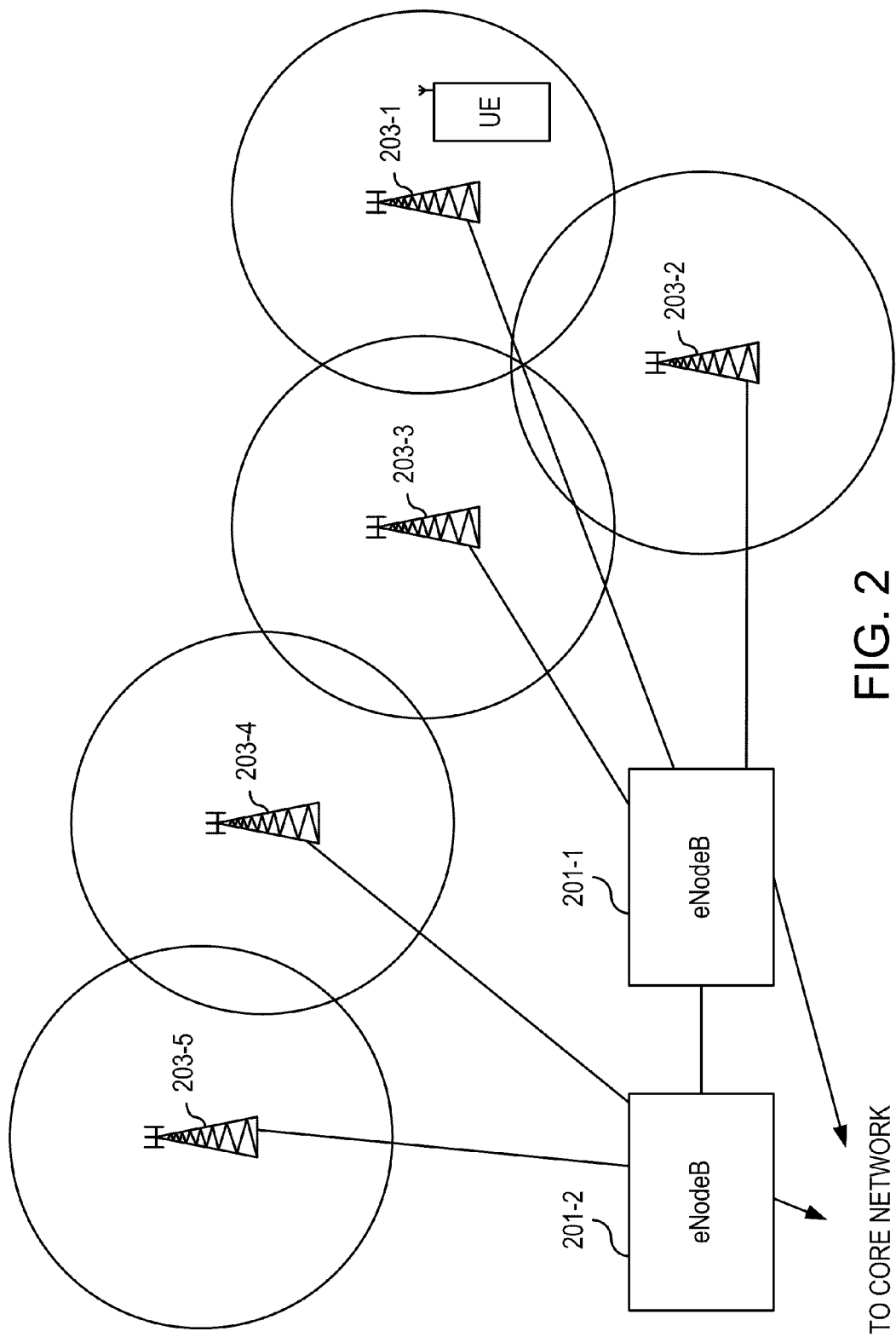
FIG. 2 is a simplified cell planning diagram.
Figure 3:
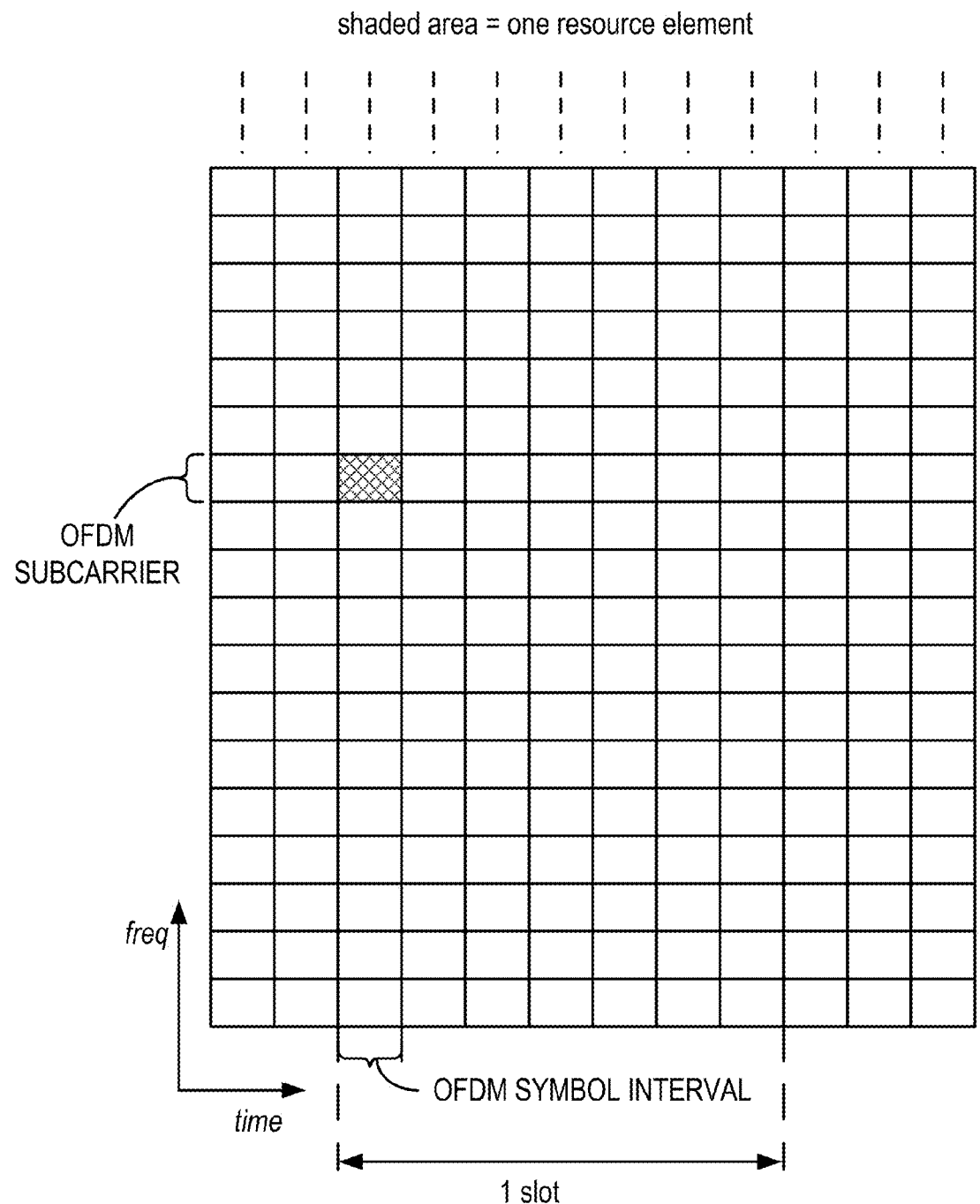
FIG. 3 is a time-frequency grid illustrating the structure of an LTE resource element.
Figure 4:
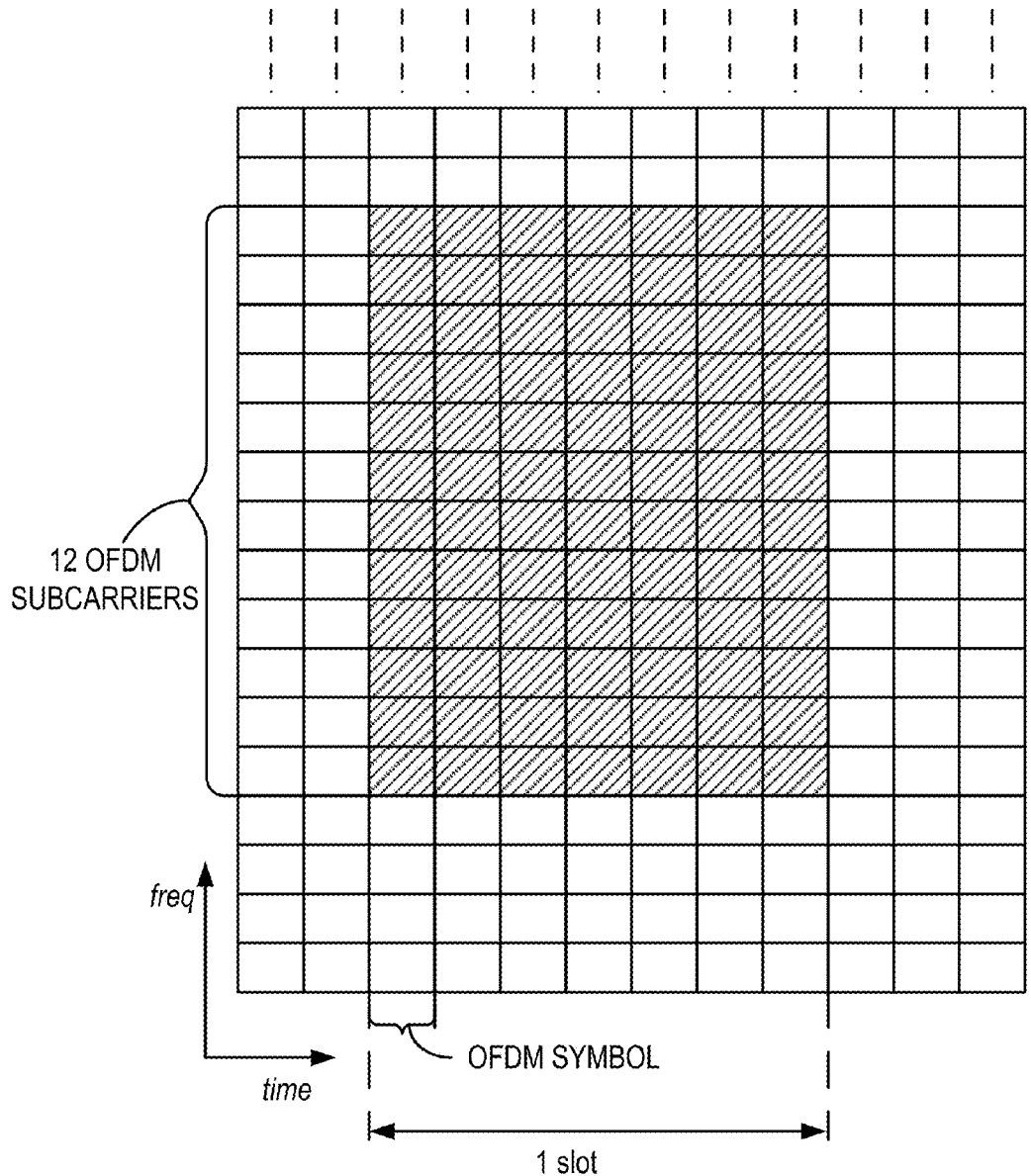
FIG. 4 illustrates how downlink subcarriers in the frequency domain are grouped into resource blocks.
Figure 5A:
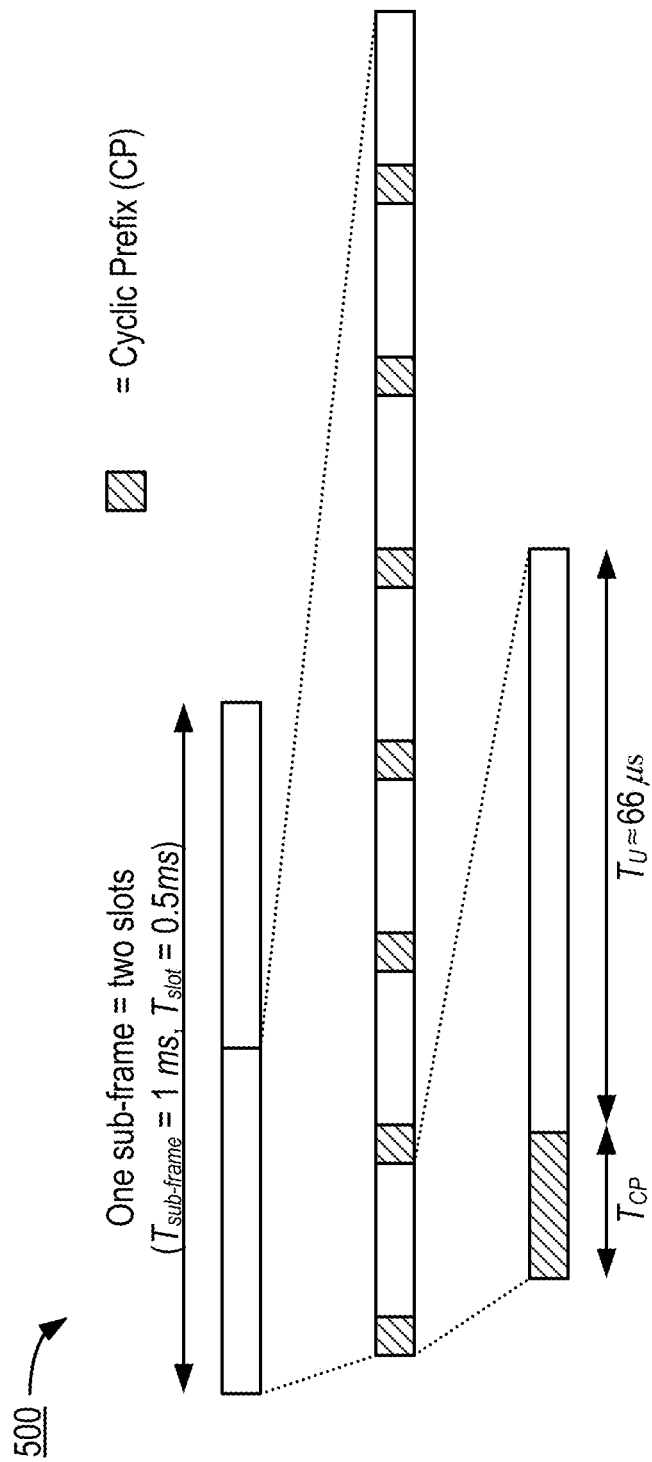
FIGS. 5a and 5b illustrate the time-domain structure for LTE downlink transmission.
Figure 5B:
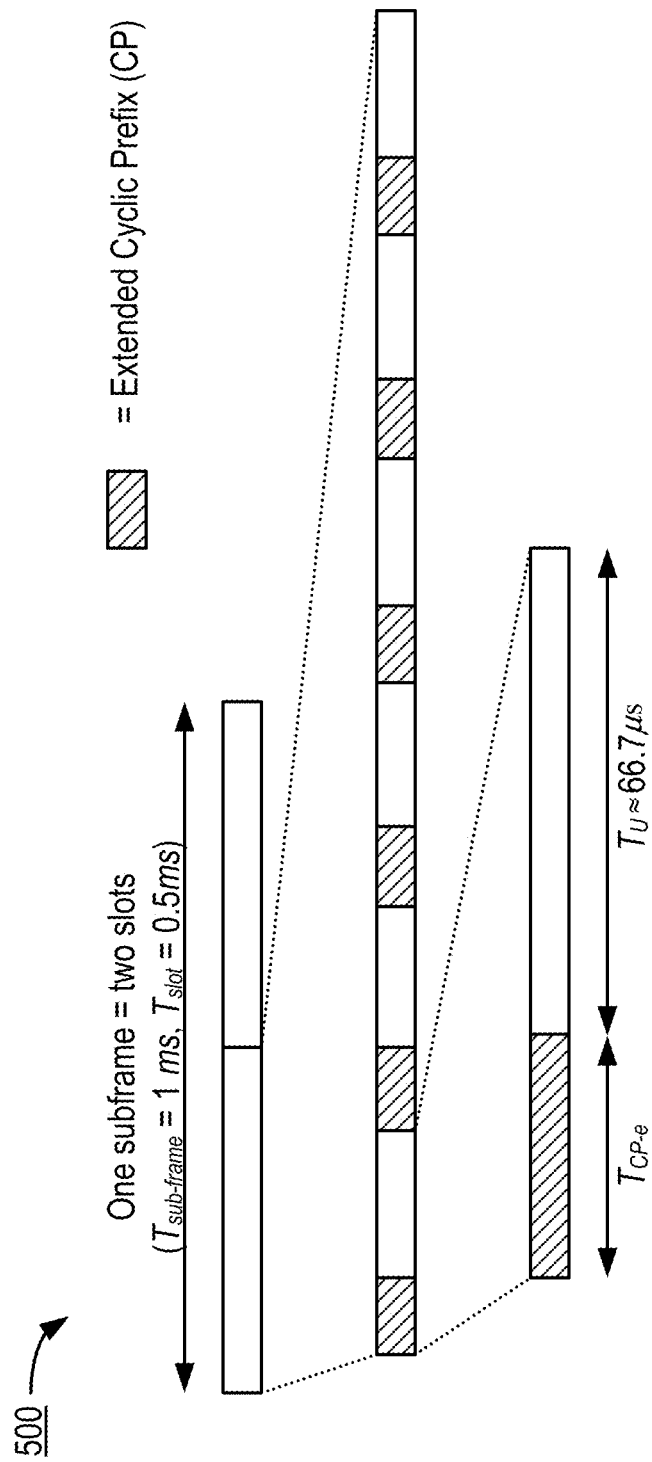
Figure 6:
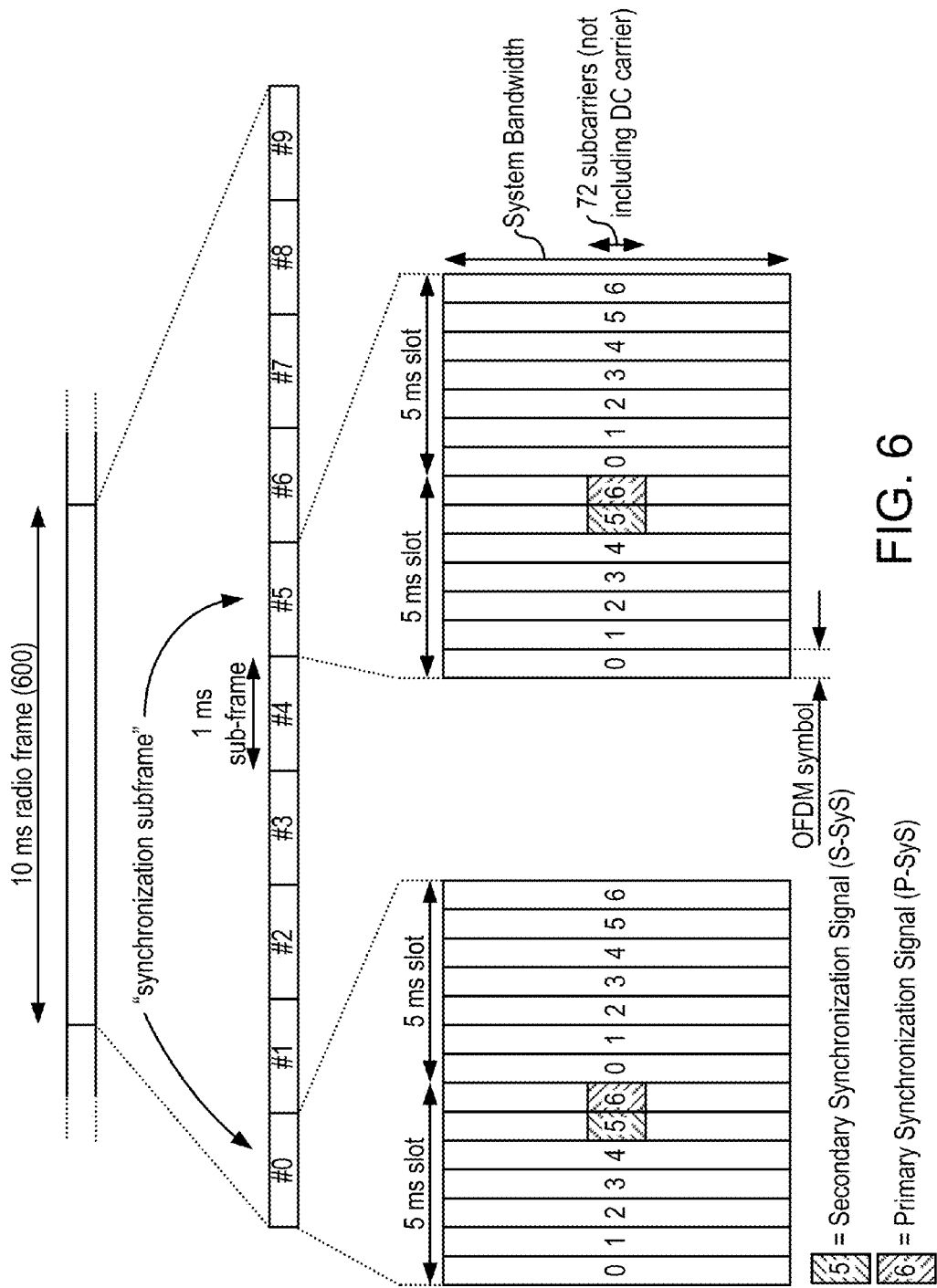
FIG. 6 illustrates the structure of the radio interface of an LTE system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

As mentioned earlier, it is desired to provide methods and apparatuses that enable an eNode B to increase the possibility of entering a DTX mode while continuing to provide necessary information to UEs within its coverage area. The inventor named herein has considered the possibility of increasing the DTX possibilities while at the same time achieving good handover performance by using the synchronization signals not only for the purposes discussed above, but also for handover measurements. Publication WO US2007/0297324 A1 (Lindoff et al.) discloses how synchronization signals can be used for handover measurements. By making measurements on the primary and secondary synchronization signals instead of on the reference signals, there is no need to transmit reference signals in sub-frames during which no UEs are receiving data. Hence, the eNode B DTX duty cycle can be increased (i.e., the eNode B can sleep through a sub-frame that it would conventionally have to be active solely for the purpose of transmitting reference signals.

Since, in LTE systems, each secondary synchronization signal consists of two sub-sequences, some of the cell groups have one short secondary synchronization sequence code in common. In practice that means that the processing gain is reduced, making the separation between the secondary synchronization signals smaller. For positioning purposes, the requirements for finding cells (in total 3-4 cells including serving cell) are below (i.e., 10-15 dB) those for being able to find the strongest (e.g., serving) cell. Furthermore, in order to have good handover performance, handover measurements need to be fairly accurate. Hence, in case the cell IDs of adjacent cells have parts of their primary synchronization signals and secondary synchronization signals in common, poorer measurement performance is achieved if the problem is not handled in some manner.

Therefore, one aspect of embodiments consistent with the invention is to adapt the handover measurement scheme based on the serving and neighbouring cell's cell identity. These cell identities can be detected by the UE using a cell search procedure. In case the UE detects several cells having synchronization signals that are too highly correlated with one another in one or more synchronization sub-frames (e.g., their correlation exceeds a predetermined threshold during those sub-frames), the UE put less weight on the handover measurements in those sub-frames and larger weight in other sub-frames. To take an example, suppose a UE's serving cell has cell ID x having a given primary synchronization signal and two secondary synchronization signal short codes denoted ($p1, s1a, s1b$). Suppose further that the UE detects a neighbouring cell whose cell ID y is given by a primary synchronization signal and two secondary synchronization signal short codes denoted ($p1, s1a, s1c$). Here, the primary synchronization signal (i.e., $p1$) as well as the first part of the secondary synchronization signal (i.e., $s1a$) is the same in each of the cell IDs. The UE would respond by applying less weight on handover measurements made in those synchronization sub-frames in which the correlation between the two cells' synchronization signals is high (sub-frame #0 in this example), and more weight on handover measurements made in other synchronization sub-frames, where the level of correlation between the two synchronization signals is relatively low (sub-frame #5 in the example). In another aspect of some embodiments, the weights can be binary, for example weight=0 in synchronization sub-frames having high correlation between the synchronization signal being measured and that of another detected cell (e.g., sub-frame #0 in the example) and weight=1 in other synchronization sub-frames (e.g., sub-frame #5 in the example).

These and other aspects are described in further detail below.

Figure 8:
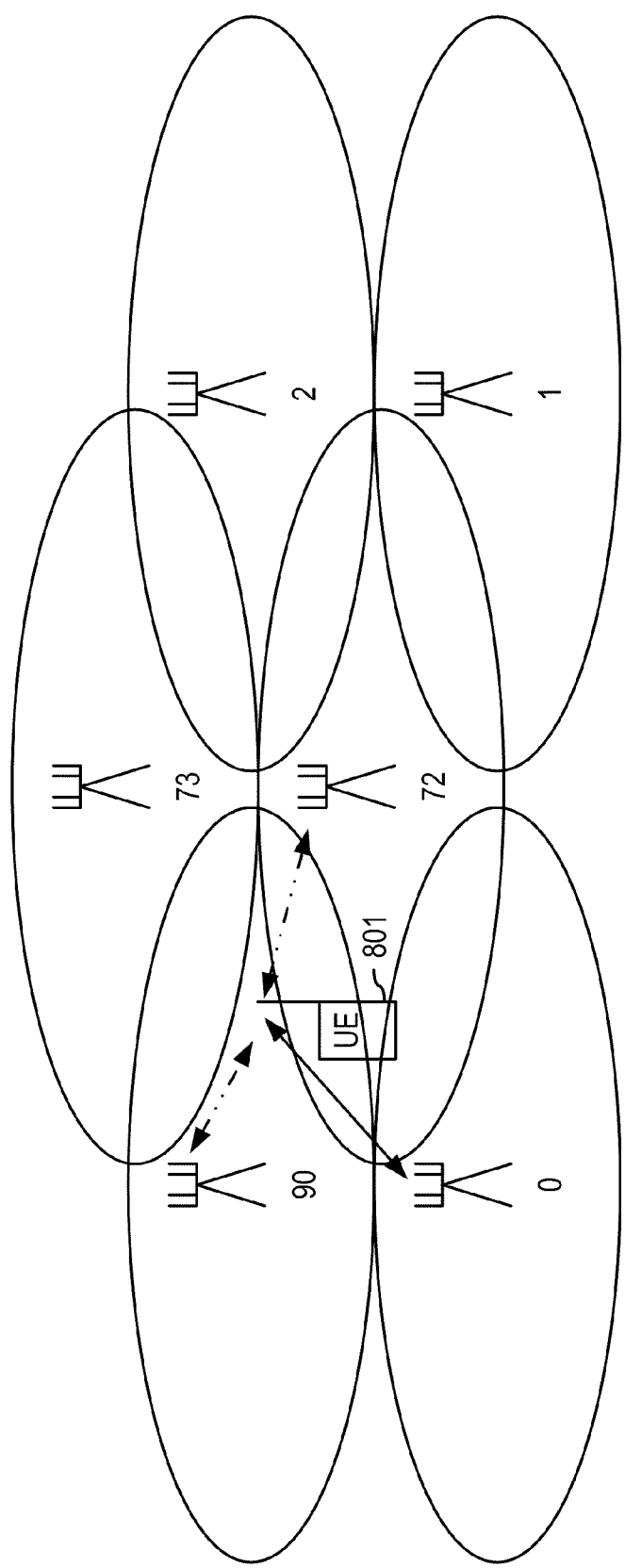
FIG. 8 shows an exemplary cellular communication system with six LTE cells, with different physical cell IDs with varying degrees of correlation properties.

To illustrate some aspects, FIG. 8 shows an exemplary cellular communication system with six LTE cells, with different physical cell IDs. All of the cells are assumed to be time aligned and synchronized (within the length of the cyclic prefix); that is, the primary synchronization sequences and secondary synchronization sequences collide between adjacent cells. In this example, a UE 801 is shown being served by a cell having a cell ID equal to 0. The UE 801 has detected two adjacent neighboring cells with cell IDs equal to 72 and 90, respectively. The cells will be referred to herein by their cell IDs. As discussed earlier, each of the cell IDs has a corresponding primary synchronization signal sequence and two secondary synchronization signal short sequences. The particular sequences that correspond to any given cell ID can be found in the LTE standards documentation (see TS36.211 v. 8.6.0, section 6.11). In this case, cell 0 has sequences (PSS, SSS sequence 1, SSS sequence 2)=(0,0,1); cell 90 has (PSS, SSS sequence 1, SSS sequence 2)=(0,0,2); and cell 72 has (PSS, SSS sequence 1, SSS sequence 2)=(0,24,25).

In this case, cell ID 0 and cell ID 90 have the same primary synchronization signal code and the same first secondary synchronization signal short code. This combination gives rise to a detrimentally high correlation between synchronization signals of the two cells in some synchronization sub-frames. In particular, measurements based on these cells' secondary synchronization signals obtained in sub-frame #0 will give poor performance compared to measurements made in sub-frame #5. This is because the function from which the secondary synchronization signal is generated swaps its first and second short sequence inputs in sub-frame #5 compared to sub-frame #0. Because the first secondary synchronization signal short sequence is scrambled with a sequence related to the primary synchronization sequence, while the second secondary synchronization signal short sequence is scrambled with a sequence related to both the primary synchronization sequence and the first secondary synchronization sequence short code (see TS36.211, section 6.11 for details), the resultant secondary synchronization signals of cells 0 and 90 have high levels of correlation with one another is sub-frame #0, but do not in sub-frame #5.

In short, in case the PSS sequences and first SSS sequences are the same in adjacent cells, or if the PSS sequences and second SSS sequences are the same in adjacent cells, poor handover measurement performance is achieved in one of the sub-frames 0 or 5, respectively. Hence, in accordance with an aspect of some embodiments consistent with the invention, once the UE has detected the cell 90, it realizes the existence of this problem and responds by more highly weighting handover measurements of the secondary synchronization signals obtained in sub-frame #5 than handover measurements made in sub-frame #0 whenever measurements are made on cells 0 and 90. The weighting can be binary, for example equal to 0 (i.e., measurement is not taken into consideration at all) or 1 (measurement is considered fully). An easy way to implement a weight of 0 is to skip making a measurement during those synchronization sub-frames associated with a weight of 0.

Considering another aspect of the situation presented in FIG. 8, the neighboring cell 72, has (PSS, first SSS sequence, second SSS sequence)=(0,24,25). Since the both the first and second short sequences of the secondary synchronization signal differ between cells 0 and 72, the same weight can be put on handover measurements of these signals made in both sub-frame #0 and in sub-frame #5.

The examples presented above involved a binary weighting strategy. Either no weight was given to a measurement in a given sub-frame, or else full weight was given. However, in alternative embodiments, the weighting can involve a range of weights between 0 and 1, with the applied weighting being related to the amount of actual correlation between the two synchronization signals in any given synchronization sub-frame. Implementations can, for example, include a look-up table, wherein determining a weight to be applied to a measurement made for a given cell during any given one of the synchronization sub-frames involves using the cell identity of the cell and the cell identity of the neighboring cell as indices into the look-up table (e.g., stored in an addressable memory device), wherein the table is pre-programmed with values related to correlation levels between cell-related synchronization signals of respective different pairs of cells, wherein the higher the correlation level the lower the weight.

Figure 9:
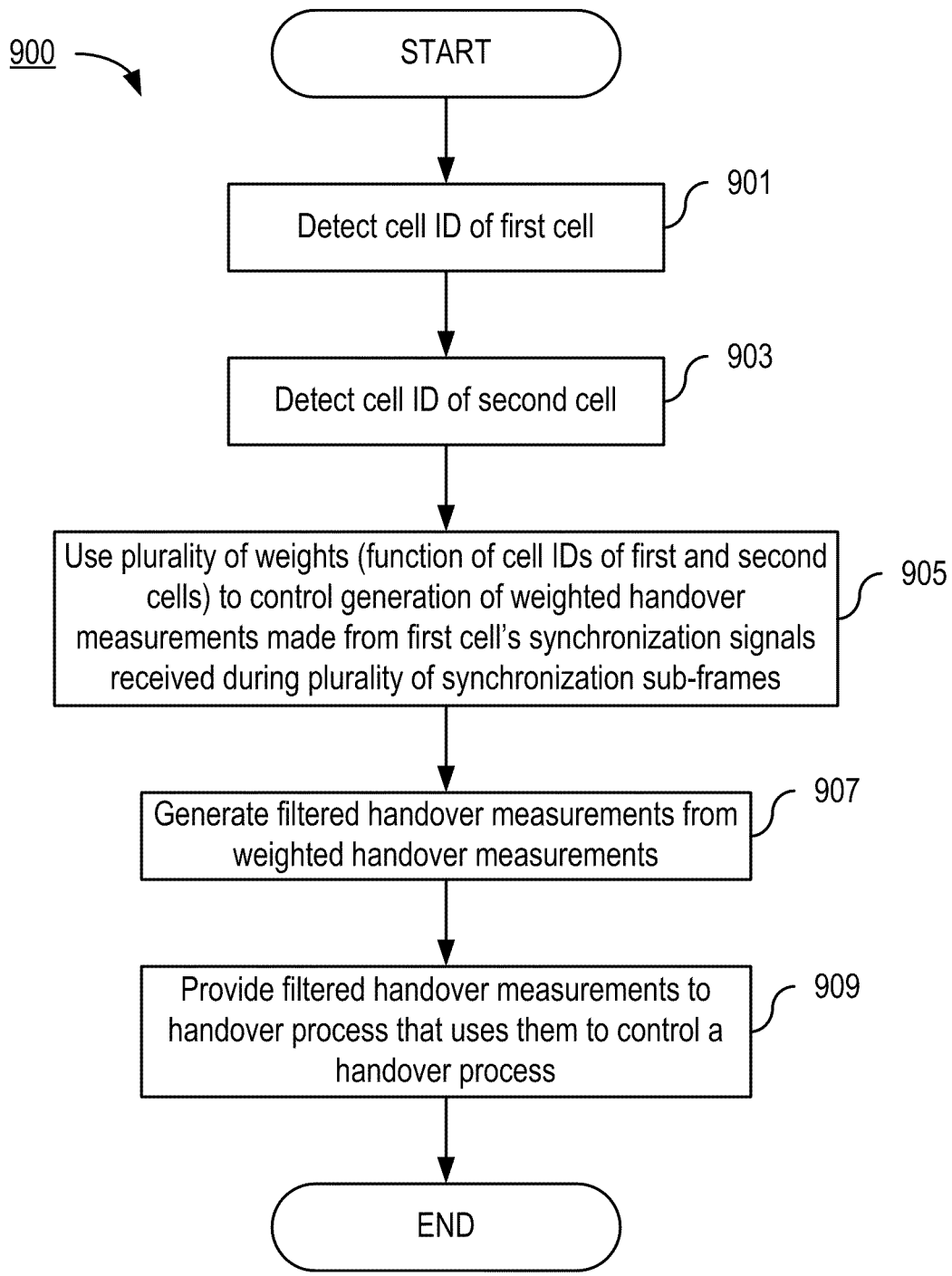
FIG. 9 is, in one respect, a flow diagram of steps/processes for making handover measurements in accordance with some embodiments consistent with the invention.

FIG. 9 is, in one respect, a flow diagram of steps/processes for making handover measurements in accordance with some embodiments consistent with the invention. FIG. 9 can alternatively also be considered to depict handover measurement circuitry 900 comprising circuitry configured to carry out the variously described functions.

The various steps are typically carried out in UE circuitry. First and second cell IDs are detected (steps 901 and 903). One of these could be the cell ID of the serving cell, but this is not a requirement of the invention (i.e., both detected cells could be neighboring cells). In an aspect of some embodiments consistent with the invention, a plurality of weights is used to control generation of a plurality of weighted handover measurements made from the first cell's synchronization signals received during a plurality of synchronization sub-frames (step 905). More particularly, the plurality of weights is applied to measurements made for the first cell during respective ones of a plurality of synchronization sub-frames. As discussed above, each of the weights is a function of the cell identity of the first cell, the cell identity of the second cell, and which ones of the first and second cells' cell-related synchronization signals are transmitted in the respective one of the plurality of synchronization sub-frames during which the weight is applied. For example, if the weight is to be applied in a sub-frame #0 in an LTE system, then each cell's secondary synchronization signal will be of a type that is generated by a function $S_1 = f_1(\tilde{S}_i, \tilde{S}_j)$, as discussed above, whereas if the weight is to be applied in a sub-frame #5, then each cell's secondary synchronization signal will be of a type that is generated by a function $S_2 = f_2(\tilde{S}_i, \tilde{S}_j)$. The particular short sequences $\tilde{S}_i$ and $\tilde{S}_j$ will depend on the cell ID.

Next, a filtered handover measurement is generated from the weighted handover measurements (step 907). Filtering can, for example, involve collecting a plurality of weighted measurements and then averaging these to obtain the filtered handover measurement. The filtered handover measurement is then provided to a handover process that uses the filtered handover measurement to control a handover process involving the user equipment (step 909). How to apply a handover measurement to control a handover process is well-known in the art and therefore does not need to be elaborated upon further in this document.

Figure 10:
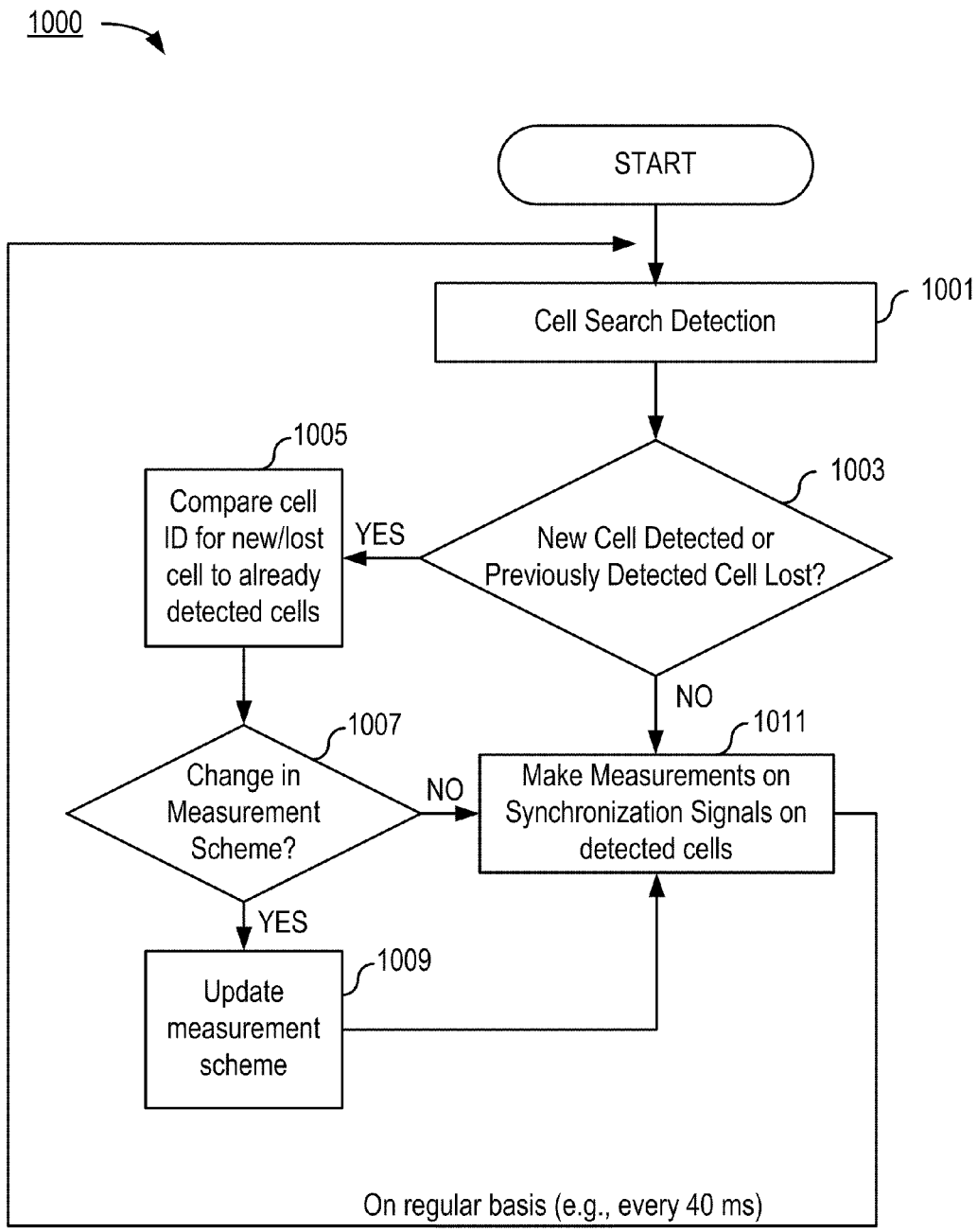
FIG. 10 is, in one respect, a flow diagram of steps/processes for making handover measurements in accordance with some embodiments consistent with the invention.

To take another example and highlight other aspects of embodiments consistent with the invention, FIG. 10 is, in one respect, a flow diagram of steps/processes for making handover measurements in accordance with some embodiments consistent with the invention. FIG. 10 can alternatively also be considered to depict handover measurement circuitry 1000 comprising circuitry configured to carry out the variously described functions.

The various steps are typically carried out in UE circuitry. The UE is presumed to be connected to a serving cell and performs a cell search (step 1001). So long as no new cells are detected or previously detected cells are lost ("NO" path out of decision block 1003), the UE performs handover measurements on already detected neighboring (as well as serving) cells (step 1005). This is typically performed on a regular basis (e.g., every 40-80 ms).

The UE monitors whether the cell search algorithms have detected a new cell or whether a monitored cell has been lost (e.g., based on whether the signal strength of the primary and secondary synchronization signals has dropped below a predetermined threshold value, whether a loss of synchronization has occurred in the primary synchronization signal correlation process. If a new cell is detected or a previously detected cell has been lost ("YES" path out of decision block 1003), the cell ID for that new or lost cell is compared to the cell ID of already detected cells (step 1005). In some embodiments, for example, the cell IDs for detected cells are checked against a look-up table (e.g., the cell IDs can be used as indices into a look-up table) and based on which cell IDs have been detected, different correlation properties and/or weights in the different sub-frames for the measurements on respective cell IDs are derived.

The purpose of this checking is to determine whether a change in measurement scheme should be made (decision block 1007). For example, when a new cell ID is detected, it is determined whether the PSS sequences and first SSS sequences are the same between the new cell ID and previously detected cell IDs, or whether the PSS sequences and second SSS sequences of the new cell ID and previously detected cell IDs are the same. If so ("YES" path out of decision block 1007), poor handover measurement performance would be achieved in one of the sub-frames 0 or 5, respectively. An adjustment to the measurement scheme would therefore be made (step 1009) to apply a low weight (e.g., zero) to measurements made in those synchronization sub-frames for which poor measurement performance would be expected.

Similarly, when a previously detected cell has been lost ("YES" path out of decision block 1003), it may be the case that that cell ID's correlation properties with respect to other already detected cells had previously caused a low weight to be applied in some synchronization sub-frames. This can be ascertained by comparing the cell ID of the lost cell to those of other already detected cells (step 1005). With this knowledge, it can then be ascertained whether a change in measurement scheme should be made (decision block 1007). For example, if particular synchronization sub-frames had previously been associated with poor correlation performance for some cells but, due to the loss of the cell, no longer are ("YES" path out of decision block 1007), the measurement scheme can be revised to now apply a higher weight (e.g., weight equal to "1") in those synchronization sub-frames (step 1009).

Thus, as a result of measurement scheme adjustment, it could be the case that some cells are measured only in sub-frame #0, others are measured only in sub-frame #5, and that yet others are measured in both sub-frames #0 and #5, perhaps with equal or differing weights being applied to the measurements in different synchronization sub-frames.

After the measurement scheme is adjusted (after step 1009), or in case no change is to be made to the measurement scheme ("NO" path out of decision path 1007), or in case no new cells were detected and no previously-detected cells were lost ("NO" path out of decision block 1003), measurement are made for detected cells during synchronization sub-frames (step 1011). As previously described, this can involve generating a plurality of weighted measurements and then filtering these in some manner (e.g., applying an averaging function) to arrive at a filtered measurement that can be provided to a handover process that uses the filtered handover measurement to control a handover process involving the user equipment.

In practice, the above-described process is repeated on a regular basis (e.g., every 40 ms). The logic depicted in FIG. 10 has been derived assuming an active UE, but it will be appreciated that the various aspects illustrated in the figure are equally applicable to an idle UE (i.e., a UE camping on a cell and performing cell reselection measurements and the like).

Figure 11:
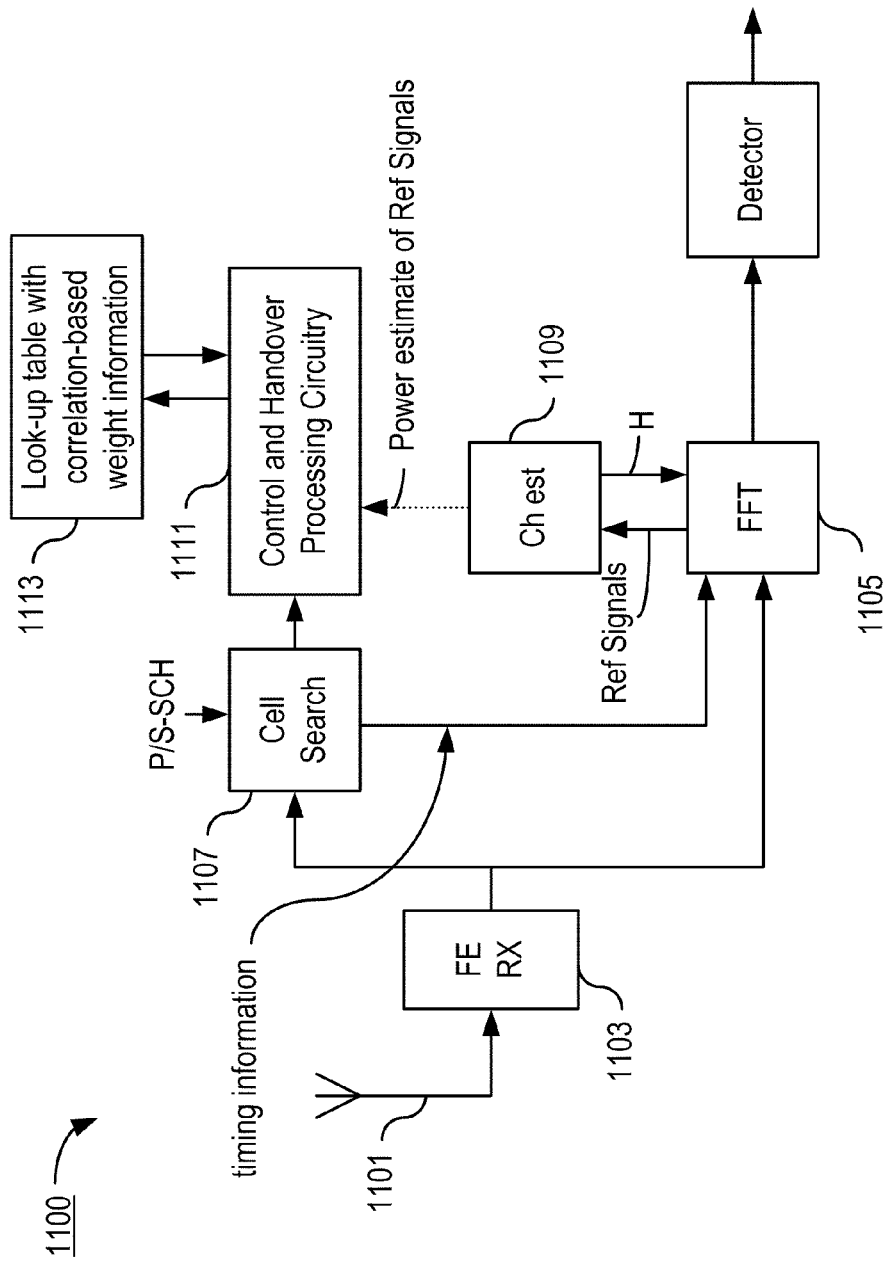
FIG. 11 is a block diagram of an exemplary UE comprising circuitry configured to carry out any of the various processes in accordance with aspects of embodiments consistent with the invention.

FIG. 11 is a block diagram of an exemplary UE 1100 comprising circuitry configured to carry out any of the various processes described above. In order to avoid cluttering the figure with irrelevant information, only that circuitry having relevance to the inventive aspects is depicted. Those of ordinary skill in the art will readily appreciated that in practice, a UE contains many more circuit elements.

As shown in FIG. 11, a signal is received in an antenna 1101 and down converted to a baseband signal in the front end receiver (FE RX) 1103. The baseband signal is sent to both a Fast Fourier Transform (FFT) unit 1105 and a cell search unit 1107. The cell search unit 1107 finds new cells by correlating the received signal to the synchronization signal received on the Synchronization Channel (SCH), and also determines the timing of the serving cell and that of neighboring cells. An SCH power estimate of the serving cell is made by the cell search unit 1107 and supplied to a control and handover processing circuitry 1111 that causes the UE circuitry to operate in accordance with any of the embodiments described above, such as those depicted in FIGS. 9 and 10.

The timing information generated by the cell search unit 1107 is used by the FFT unit 1105 to determine the samples on which to perform the FFT. The reference signal is extracted and sent to a channel estimation (CH est) unit 1109, which estimates the channel (represented by a vector H). In some but not necessarily all embodiments, system specifications require that handover decisions be based on measurements that are expressed in terms of reference signal power rather than synchronization signal power. To accommodate such systems, the channel estimator 1109 can also compute the serving cell's reference signal power and feed this (shown in FIG. 11 with dotted lines to indicate that this feature is not present in all embodiments) to the control and handover processing circuitry 1111 which, as mentioned above, causes the UE circuitry to operate in accordance with any of the embodiments described above, such as those depicted in FIGS. 9 and 10. Techniques for scaling synchronization signal measurements so that they can serve as reference signal measurements are known in the art, as evidenced by the publication US2007/0297324, which was referenced earlier. To assist the control and handover processing circuitry 1111, a look-up table 1113 is provided. Information stored in the look-up table 1113 allows the control and handover processing circuitry 1111 to know weights and/or correlation information for different pairs of cell IDs, as discussed above.

Various embodiments consistent with aspects of the invention offer a number of advantages. For example, handover measurements based on the synchronization channels can now be made more robust. This in turn improves measurement accuracy which improves the handover performance (active mode) and reduces the amount of time that a receiver needs to be activated for measurement in idle mode (i.e., power consumption reduction in the UE is achieved). Furthermore, the measurement scheme also improves positioning performance in LTE in case positioning (Time of Arrival—"TOA""—and the like) is estimated using the synchronization channels.

The invention has been described with reference to particular embodiments. However, it will be readily apparent to those skilled in the art that it is possible to embody the invention in specific forms other than those of the embodiment described above.

Figure 7A:
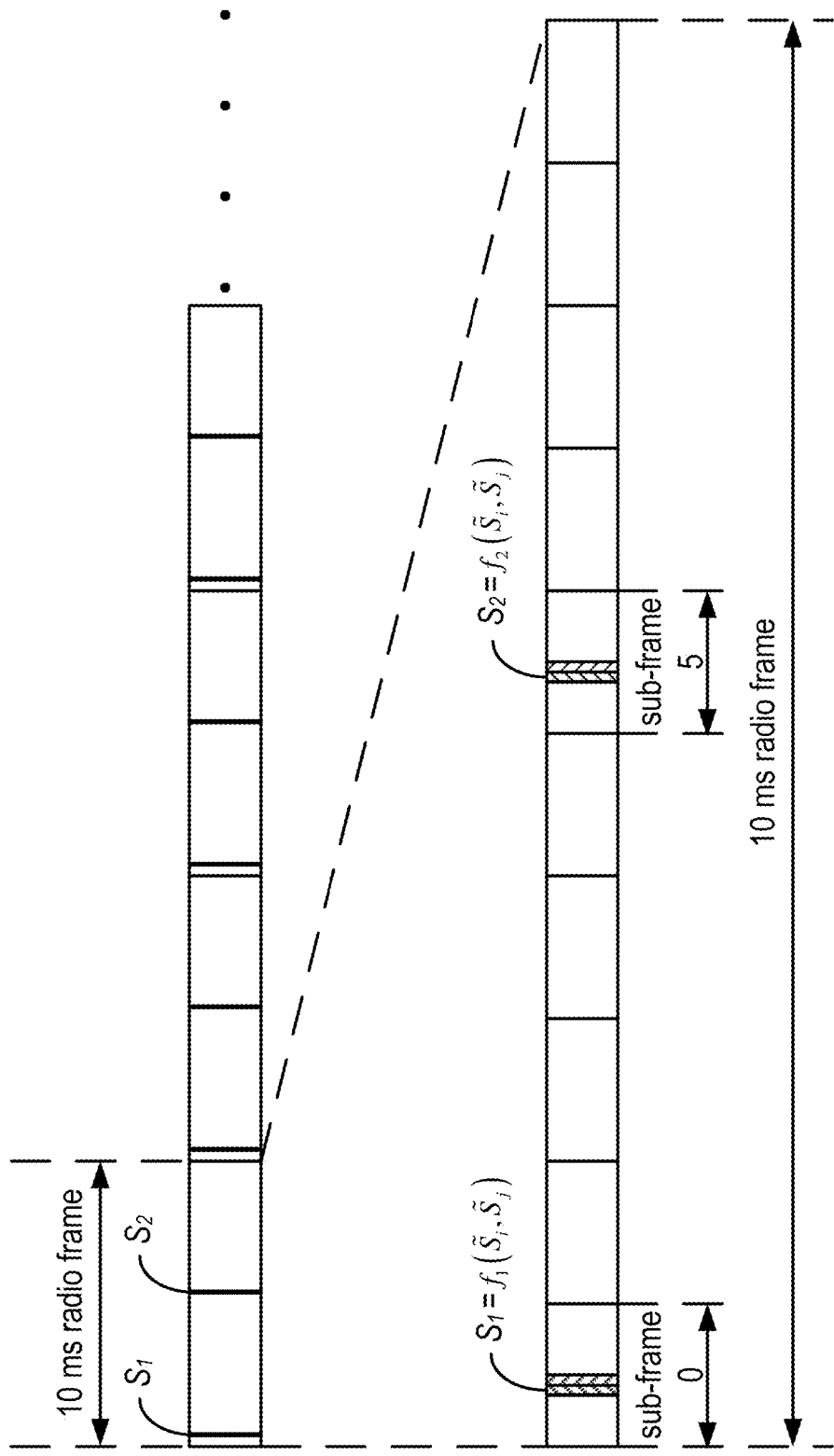
FIGS. 7a and 7b illustrate how secondary synchronization signal sequences can be transmitted.
Figure 7B:
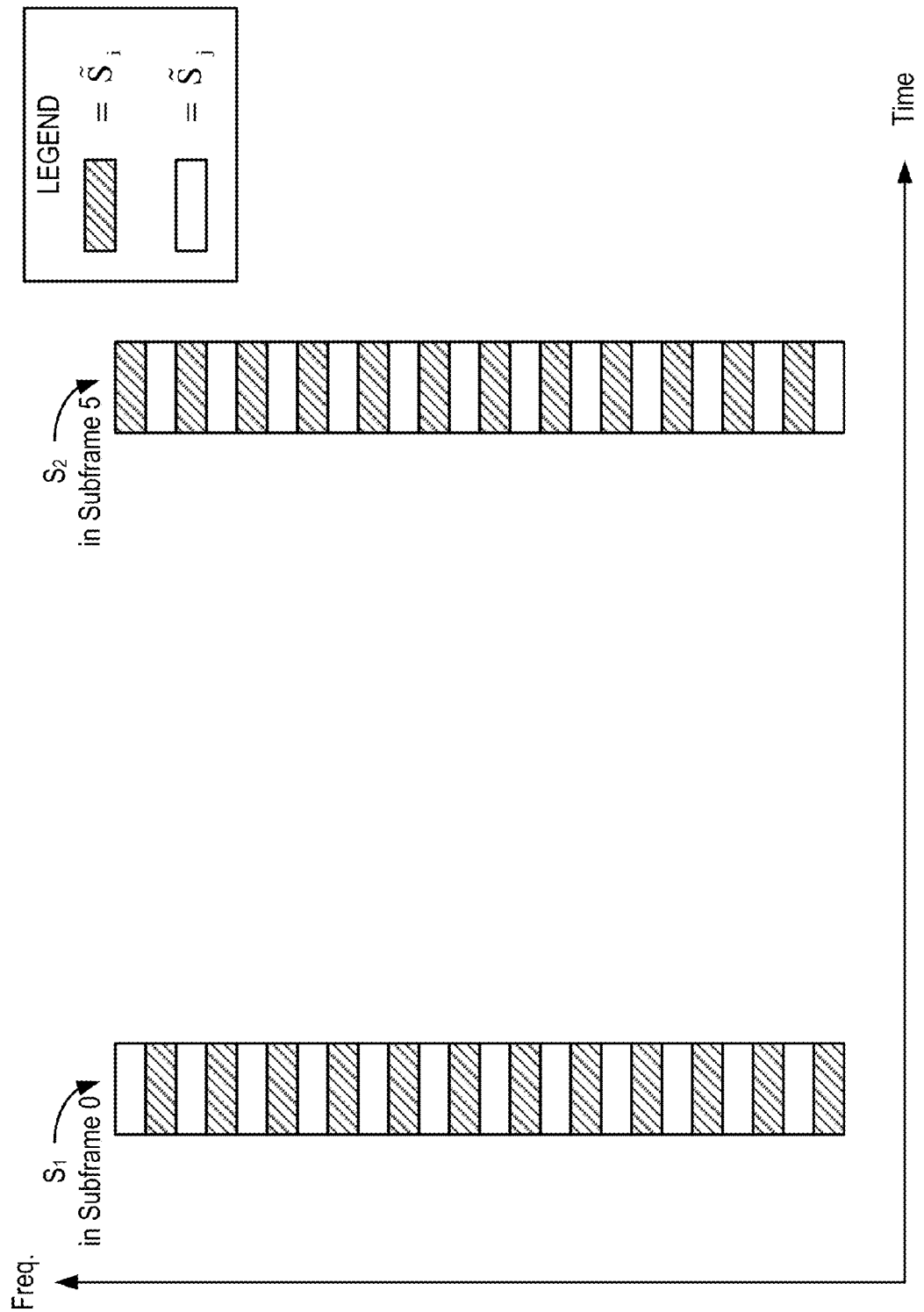

For example, the weights in the exemplary embodiments presented above are all applied to a measurement of an entire synchronization signal. For example, if the power of a received synchronization signal is to contribute fully to a filtered handover measurement, it can be given a weight of "1"; conversely, if bad correlation properties lead to a decision that the measurement of that synchronization signal should not be considered, then it can be given a weight of "0". However, the term "weight", as used herein, is intended to be used more broadly to cover any mechanism that allows synchronization signals received in some synchronization sub-frames to contribute more or less than the synchronization signals received in other synchronization sub-frames. This includes, but is not limited to, the types of weights discussed earlier. For example, another type of weighting can be utilized, as illustrated in the following example. Suppose that two cell IDs share the same primary synchronization signal and the same first secondary synchronization short sequence. This leads to a conclusion that there is a "collision" in sub-frame #0 but not in sub-frame #5. Rather than ignoring all of those cells' synchronization signals received in sub-frame #0, a type of weighting can be applied wherein, for sub-frame #0, only those parts of the received secondary synchronization signal whose frequencies are mapped to the second secondary synchronization short sequence are measured; those parts of the secondary synchronization signal whose frequencies are mapped to the first secondary synchronization short sequence are ignored. (See FIG. 7b for an example of such frequency mapping.) In sub-frame #5, in which there is no "collision", the weighting can permit the secondary synchronization signal to be measured in its entirety (i.e., not omitting any frequencies in the measurement). That is, the weighting associated with sub-frame #0 for these two cells results in more than none and less than all frequency components of a received synchronization signal contributing to a handover measurement.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method performed by a user equipment operating in a mobile communication system that comprises equipment for serving a plurality of geographic cells and having an air interface that is divided into sequentially occurring frames, wherein each of the frames consists of a plurality of sub-frames at least two of which are synchronization sub-frames, wherein for each of the cells served by the mobile communication system, a respective one of a plurality of cell-related synchronization signals is transmitted to user equipments in the at least two synchronization signal sub-frames of every frame, the method comprising:

detecting a cell identity of a first cell in the mobile communication system;

detecting a cell identity of a second cell in the mobile communication system;

using a plurality of weights to control generation of a plurality of weighted handover measurements made from the first cell's synchronization signals received during a plurality of synchronization sub-frames, wherein the plurality of weights are applied to measurements made for the first cell during respective ones of the plurality of synchronization sub-frames, and wherein each of the weights is a function of the cell identity of the first cell, the cell identity of the second cell, and which ones of the first and second cells' cell-related synchronization signals are transmitted in the respective one of the plurality of synchronization sub-frames during which the weight is applied;

generating a filtered handover measurement from the weighted handover measurements; and providing the filtered handover measurement to a handover process that uses the filtered handover measurement to control a handover process involving the user equipment.

2. The method of claim 1, wherein:

each of the cell-related synchronization signals comprises a primary synchronization signal and a secondary synchronization signal, wherein the secondary synchronization signal conveys both a first sequence and a second sequence; and the plurality of weights to be applied to measurements made for the first cell during respective ones of the plurality of synchronization sub-frames are determined by:

ascertaining whether the primary synchronization signal of the first cell is the same as the primary synchronization signal of the second cell; and ascertaining at least one of the following:
whether the first sequence conveyed by the secondary synchronization signal of the first cell is the same as the first sequence conveyed by the secondary synchronization signal of the second cell; and
whether the second sequence conveyed by the secondary synchronization signal of the first cell is the same as the second sequence conveyed by the secondary synchronization signal of the second cell.

3. The method of claim 2, comprising:

applying a weight of zero to a measurement made for the first cell during any synchronization sub-frame in which:

both the primary synchronization signals and the first sequences conveyed by the secondary synchronization signals of the first and second cells are the same, and/or both the primary synchronization signals and the second sequences conveyed by the secondary synchronization signals of the first and second cells are the same.

4. The method of claim 3, wherein applying a weight of zero to a measurement made for the first cell comprises:

inactivating a receiver of the user equipment during any synchronization sub-frame in which both the primary synchronization signals and the first sequences conveyed by the secondary synchronization signals of the first and second cells are the same, and/or both the primary synchronization signals and the second sequences conveyed by the secondary synchronization signals of the first and second cells are the same; and not contributing a weighted handover measurement to the plurality of weighted handover measurements.

5. The method of claim 1, wherein generating the filtered handover measurement from the weighted handover measurements comprises generating an average handover measurement from the weighted handover measurements.

6. The method of claim 1, wherein each of the weights is a function of, for any given one of the synchronization sub-frames, a level of correlation between a cell-related synchronization signal of the first cell communicated during the given synchronization sub-frame and a cell-related synchronization signal of the second cell communicated during the given synchronization sub-frame.

7. The method of claim 6, wherein the weights have values ranging from 0 to 1.

8. The method of claim 1, comprising:
determining a weight to be applied to a measurement made for the first cell during any given one of the synchronization sub-frames by using the cell identity of the first cell and the cell identity of the second cell as indices into a table stored in an addressable memory device, wherein the table is pre-programmed with values related to correlation levels between cell-related synchronization signals of respective different pairs of cells, wherein the higher the correlation level the lower the weight.

9. The method of claim 1, wherein one or more of the weights result in more than none and less than all frequency components of a received synchronization signal contributing to a handover measurement.

10. An apparatus for use in a user equipment operating in a mobile communication system that comprises equipment for serving a plurality of geographic cells and having an air interface that is divided into sequentially occurring frames, wherein each of the frames consists of a plurality of sub-frames at least two of which are synchronization sub-frames, wherein for each of the cells served by the mobile communication system, a respective one of a plurality of cell-related synchronization signals is transmitted to user equipments in the at least two synchronization signal sub-frames of every frame, the apparatus comprising:
circuitry configured to detect a cell identity of a first cell in the mobile communication system;
circuitry configured to detect a cell identity of a second cell in the mobile communication system;
circuitry configured to use a plurality of weights to control generation of a plurality of weighted handover measurements made from the first cell's synchronization signals received during a plurality of synchronization sub-frames, wherein the circuitry configured to use the plurality of weights applies the plurality of weights to measurements made for the first cell during respective ones of the plurality of synchronization sub-frames, and wherein each of the weights is a function of the cell identity of the first cell, the cell identity of the second cell, and which ones of the first and second cells' cell-related synchronization signals are transmitted in the respective one of the plurality of synchronization sub-frames during which the weight is applied;
circuitry configured to generate a filtered handover measurement from the weighted handover measurements; and circuitry configured to provide the filtered handover measurement to a handover process that uses the filtered handover measurement to control a handover process involving the user equipment.

11. The apparatus of claim 10, wherein:
each of the cell-related synchronization signals comprises a primary synchronization signal and a secondary synchronization signal, wherein the secondary synchronization signal conveys both a first sequence and a second sequence; and
the apparatus comprises circuitry for determining the plurality of weights to be applied to measurements made for the first cell during respective ones of the plurality of synchronization sub-frames by:
ascertaining whether the primary synchronization signal of the first cell is the same as the primary synchronization signal of the second cell; and
ascertaining at least one of the following:
whether the first sequence conveyed by the secondary synchronization signal of the first cell is the same as the first sequence conveyed by the secondary synchronization signal of the second cell; and
whether the second sequence conveyed by the secondary synchronization signal of the first cell is the same as the second sequence conveyed by the secondary synchronization signal of the second cell.

12. The apparatus of claim 11, comprising:
circuitry configured to apply a weight of zero to a measurement made for the first cell during any synchronization sub-frame in which:
both the primary synchronization signals and the first sequences conveyed by the secondary synchronization signals of the first and second cells are the same, and/or both the primary synchronization signals and the second sequences conveyed by the secondary synchronization signals of the first and second cells are the same.

13. The apparatus of claim 12, wherein the circuitry configured to apply a weight of zero to a measurement made for the first cell comprises:
circuitry configured to inactivate a receiver of the user equipment during any synchronization sub-frame in which both the primary synchronization signals and the first sequences conveyed by the secondary synchronization signals of the first and second cells are the same, and/or both the primary synchronization signals and the second sequences conveyed by the secondary synchronization signals of the first and second cells are the same; and
circuitry configured to inhibit contributing a weighted handover measurement to the plurality of weighted handover measurements.

14. The apparatus of claim 10, wherein the circuitry configured to generate the filtered handover measurement from the weighted handover measurements comprises circuitry configured to generate an average handover measurement from the weighted handover measurements.

15. The apparatus of claim 10, wherein each of the weights is a function of, for any given one of the synchronization sub-frames, a level of correlation between a cell-related synchronization signal of the first cell communicated during the given synchronization sub-frame and a cell-related synchronization signal of the second cell communicated during the given synchronization sub-frame.

16. The apparatus of claim 15, wherein the weights have values ranging from 0 to 1.

17. The apparatus of claim 10, comprising:
 circuitry configured to determine a weight to be applied to a measurement made for the first cell during any given one of the synchronization sub-frames by using the cell identity of the first cell and the cell identity of the second cell as indices into a table stored in an addressable memory device, wherein the table is pre-programmed with values related to correlation levels between cell-related synchronization signals of respective different pairs of cells, wherein the higher the correlation level the lower the weight.

18. The apparatus of claim 10, wherein one or more of the weights result in more than none and less than all frequency components of a received synchronization signal contributing to a handover measurement.

* * * * *

UNITED STATES PATENT AND TRADEMARK OFFICE
CERTIFICATE OF CORRECTION

PATENT NO. : 8,437,308 B2
APPLICATION NO. : 12/612773
DATED : May 7, 2013
INVENTOR(S) : Lindoff It is certified that error appears in the above-identified patent and that said Letters Patent is hereby corrected as shown below:

In the Specification

In Column 2, Lines 44-45, delete "$106 \cdot T_S 5.1$ μs" and insert -- $106 \cdot T_S \approx 5.1$ μs --, therefor.

In Column 2, Line 50, delete "$512 \cdot T_S 16.7$ μs." and insert -- $512 \cdot T_S \approx 16.7$ μs. --, therefor.

Signed and Sealed this
Eighth Day of October, 2013

Teresa Stanek Rea
*Deputy Director of the United States Patent and Trademark Office*